(12) United States Patent
Diaz

(10) Patent No.: US 7,322,029 B2
(45) Date of Patent: Jan. 22, 2008

(54) METHOD AND SYSTEM FOR RECOVERING PROGRAM CODE IN A COMPUTER SYSTEM

(75) Inventor: Juan Diaz, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 651 days.

(21) Appl. No.: 10/434,025

(22) Filed: May 8, 2003

(65) Prior Publication Data

US 2004/0225873 A1   Nov. 11, 2004

(51) Int. Cl.
   *G06F 9/44* (2006.01)
(52) U.S. Cl. .................................... 717/168
(58) Field of Classification Search ............... 717/168, 717/169; 714/2, 5, 36
See application file for complete search history.

(56) References Cited

U.S. PATENT DOCUMENTS

| | | | | |
|---|---|---|---|---|
| 5,388,267 A * | 2/1995 | Chan et al. | ..................... | 713/2 |
| 5,579,522 A * | 11/1996 | Christeson et al. | ............ | 713/2 |
| 6,438,688 B1 * | 8/2002 | Nunn | ............................. | 713/2 |
| 6,715,106 B1 * | 3/2004 | Mermelstein | ................ | 714/36 |
| 2002/0147941 A1 * | 10/2002 | Gentile | ......................... | 714/36 |
| 2003/0028800 A1 * | 2/2003 | Dayan et al. | ................ | 713/200 |
| 2003/0033515 A1 * | 2/2003 | Autry | ......................... | 713/100 |

* cited by examiner

*Primary Examiner*—Wei Zhen
*Assistant Examiner*—Philip Wang
(74) *Attorney, Agent, or Firm*—Hope Baldauff Hartman, LLC

(57) ABSTRACT

A method and computer system are provided for recovering program code in a memory device. A determination is made as to whether current program code stored in a memory device in the computer system is valid. The current program code may be current BIOS code for the computer system. If it is determined that the current program code is invalid, code stored in the memory device is executed to copy an image file from a storage device to a main memory in the computer system. The image file includes recovery program code for the memory device. The current program code in the memory device is then updated with the recovery program code from the main memory. Prior to updating the current program code, a flag is set indicating that the current program code needs to be updated. A boot of the computer system is then initiated from the image file and upon detecting the flag, the boot of the computer system is interrupted. While the current program code in the memory device is being updated with the recovery program code, status messages related to the ongoing update may be displayed on a video display device in the computer system.

21 Claims, 4 Drawing Sheets

METHOD AND SYSTEM FOR RECOVERING PROGRAM CODE IN A COMPUTER SYSTEM

TECHNICAL FIELD

The present invention is related to computer system configuration. More particularly, the present invention is related to recovering program code in a memory device in a computer system.

BACKGROUND OF THE INVENTION

Some computer systems have a firmware basic input/output system ("BIOS") containing basic routines which are accessed to boot the computer as well as to initialize and interface hardware with operating system software. In many modern computer systems, the BIOS code is stored as groups of memory "blocks" in one or more re-programmable memory devices. These re-programmable memory devices, which are typically known as "flash" parts, are a type of non-volatile random access memory ("NVRAM") allowing the BIOS code to be easily updated by using software to erase and program each flash part. Most flash parts are divided into sectors which enable a portion of BIOS code stored in a flash part to be updated without modifying the remainder of the code. One such sector includes a hardware protected memory block of a fixed size called a "boot block" which can not be erased when the hardware protection is engaged. The boot block in a flash part may store program code for starting a computer system as well as a self contained recovery code for recovering the BIOS to the flash part in the event the BIOS is unintentionally erased.

In recent years the number of flash part vendors has increased resulting in a corresponding increase in the number of flash part models that must be supported by a particular BIOS in a computer system. However, the addition of new flash parts poses a number of problems for the boot block sector. First, each time support for a new flash part model is added to a BIOS, the boot block code must be updated to recognize each new flash part model. Second, in a particular BIOS, the different flash part models may require that unique program code for recovering the contents of a flash part be stored in the boot block sector. However, due to the fixed size of the boot block sector in a flash part, there is a risk of running out of space to store the recovery code in the boot block as support for new flash parts are added.

It is with respect to these considerations and others that the present invention has been made.

SUMMARY OF THE INVENTION

In accordance with the present invention, the above and other problems are solved by methods for recovering program code, such as BIOS code, in a memory device in a computer system. According to one method, a determination is made as to whether current program code stored in a memory device in the computer system is valid. The determination of whether the current program code stored in the memory device is valid may include determining whether the current program code is corrupted or determining whether a user initiated request to update the current program code has been made by a user.

The current program code may be current BIOS code for the computer system. If it is determined that the current program code is invalid, code stored in the memory device is executed to copy an image file from a storage device to a main memory in the computer system. The image file includes recovery program code for the memory device. The recovery program code may be a copy of the current program code or an updated version of the current program code. The current program code in the memory device is then updated with the recovery program code from the main memory. If, however, it is determined that the current program is valid, then a boot of the computer system is initiated from the current program code.

Prior to updating the current program code, a flag is set indicating that the current program code needs to be updated. A boot of the computer system is then initiated from the image file and upon detecting the flag, the boot of the computer system is interrupted. While the current program code in the memory device is being updated with the recovery program code, status messages related to the ongoing update may be displayed on a video display device in the computer system. Updating the current program code in the memory device with the recovery program code may include identifying the memory device, selecting recovery code in the image file for programming the identified memory device, and executing the selected recovery code to program the identified memory device with the recovery program code. Programming the identified memory device with the recovery program code may include erasing the current program code in the memory device, and programming the memory device with the recovery program code.

In accordance with other aspects, the present invention relates to a computer system for recovering program code stored in a memory device. The system includes a first memory device containing current program code, such as BIOS program code, for initializing the computer system, a second memory device for storing an image file containing recovery code and recovery program code for the first memory device, and a processor functionally coupled to the first and second memory devices. The processor is responsive to computer-executable instructions contained in the first memory device and is operative to determine whether the current program code stored in the first memory device in the computer system is valid. If the processor determines that the current program code is invalid, the image file is copied from a storage device in the computer system to the second memory device. From the second memory device, the processor executes the recovery code contained in the image file to update the current program code in the first memory device with the recovery program code. If the processor determines that the current program is valid, the processor initiates a boot of the computer system from the current program code.

Prior to executing the recovery code, the processor may be further operative to set a flag indicating that the current program code needs to be updated, initiate a boot of the computer system from the image file, detect the flag in the image file, and interrupt the boot of the computer system upon detecting the flag in the image file. The computer system may further include a video display device for displaying status messages while the current program code in the first memory device is being updated with the recovery program code. The processor, in executing the recovery code contained in the image file to update the current program code in the first memory device with the recovery program code, may be operative to program the first memory device with the recovery program code. Prior to programming the first memory device with the recovery program code, the processor may be operative to erase the current program code in the first memory device.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
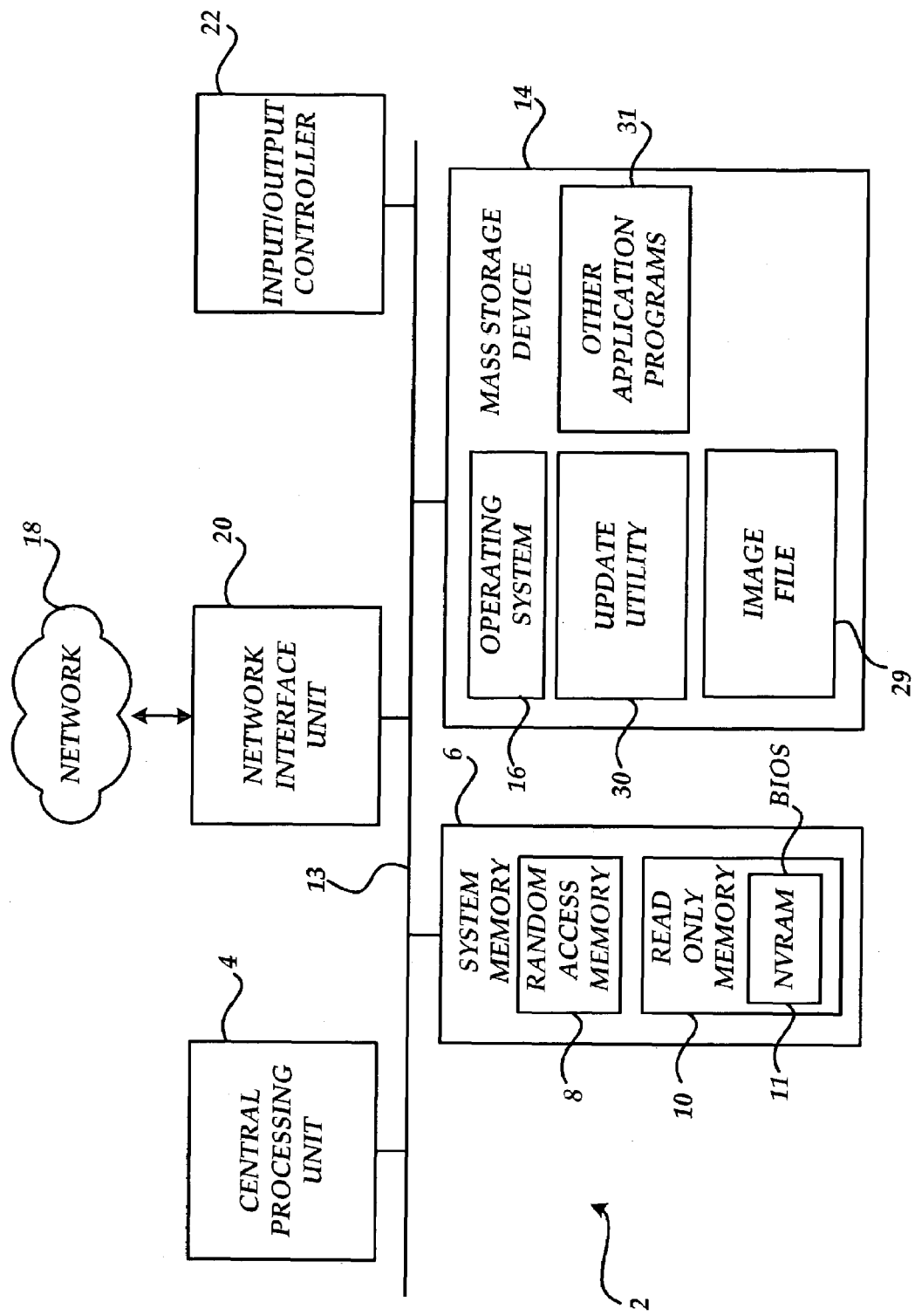
FIG. 1 illustrates a computer system architecture for recovering program code in a computer system utilized in embodiments of the invention.

Embodiments of the present invention provide methods for recovering program code in a memory device in a computer system. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 includes a standard local or server computer operative to execute one or more application programs, such as update utility 29.

Alternatively, the computer system 2 may include another type of computing device operative to access a network 18, such as a personal digital assistant or other type of computer. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4.

The ROM 10 comprises a non-volatile random access memory device ("NVRAM") 11 for storing program code which in one embodiment may be a basic input/output system ("BIOS") containing the basic routines that help to transfer information between elements within the computer. Those skilled in the art will understand that NVRAM devices may also be known as "flash parts." The basic routines contained in the BIOS are accessed to boot the computer as well as to initialize and interface hardware with operating system software. One such routine is the power-on self-test ("POST") routine. The POST routine is executed after the computer system is turned on for performing diagnostics and initializing system components in the computer system. It will be understood by those skilled in the art that the BIOS also contains routines for starting the computer system 2 which are stored in a hardware protected area of the NVRAM called a "boot block." The contents of the NVRAM 11 will be described in greater detail below with respect to FIG. 2.

The computer system 2 further includes a mass storage device 14 for storing an operating system 16, an image file 29, an update utility 30, and other application programs 31. The image file 29 contains recovery program code for the NVRAM or flash part 11. The recovery program code may be an updated version of the BIOS code (i.e., the current program code) in the NVRAM 11 or a copy of the BIOS code. The image file 29 may also contain recovery code for recovering the BIOS code in the NVRAM 11. It should be understood that the image file 29 may be contained on computer storage media or downloaded to the mass storage device 14 from the network 18 (e.g., the Internet). The contents of the image file 29 will be described in greater detail below with respect to FIG. 2.

The update utility 30 also contains code for updating the current program code in the NVRAM 11. The update utility 30 is launched from the mass storage device 14 on the CPU 4 which executes code for updating the NVRAM 11 with the recovery program code in the image file 29. Upon launching the update utility 30 the image file 29 is loaded into the RAM 8.

The mass storage device 14 is connected to the CPU 4 through a mass storage controller (not shown) connected to the bus 13. The mass storage device 14 and its associated computer-readable media, provide non-volatile storage for the computer system 2. Although the description of computer-readable media contained herein refers to a mass storage device, such as a hard disk or CD-ROM drive, it should be appreciated by those skilled in the art that computer-readable media can be any available media that can be accessed by the computer system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

Figure 2:
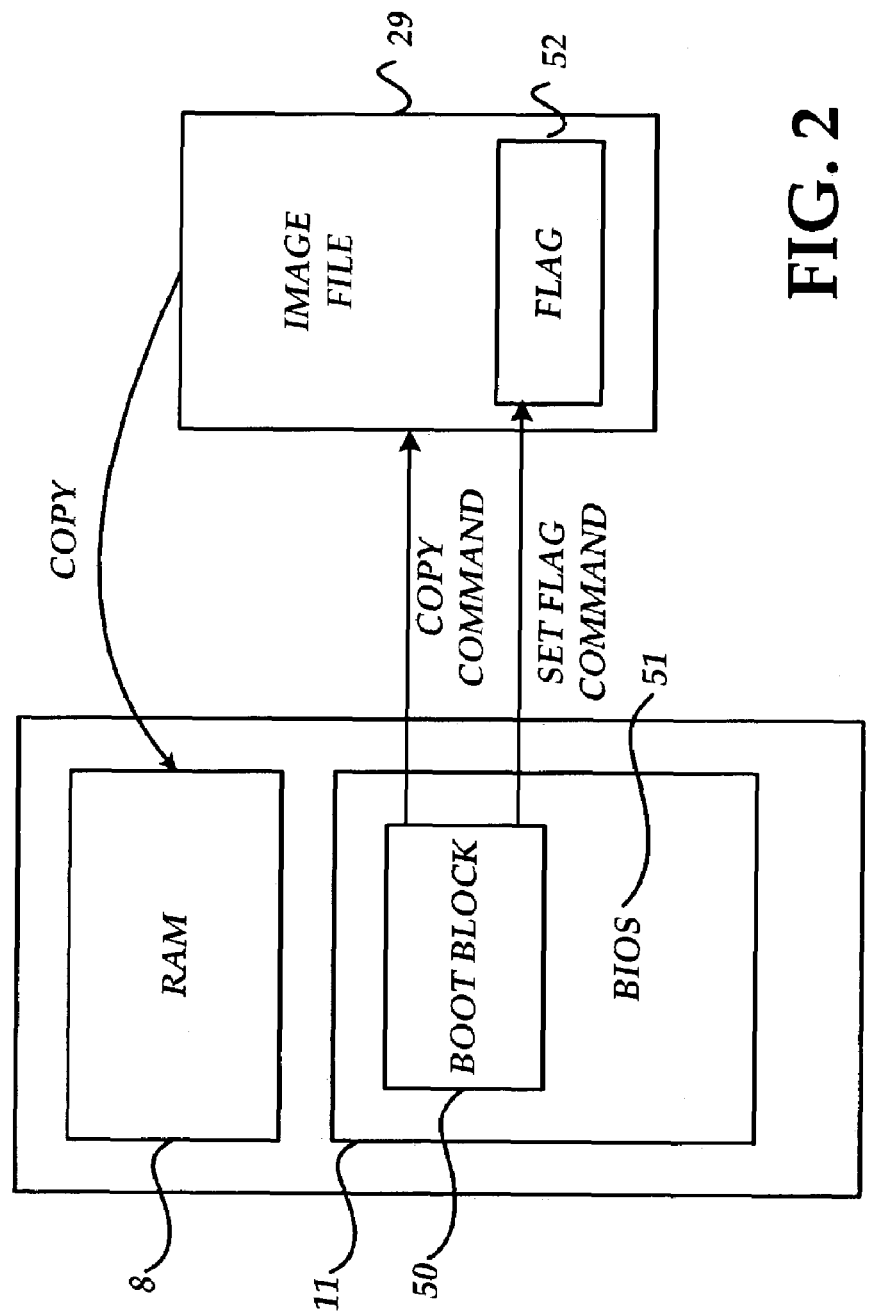
FIG. 2 illustrates a block diagram illustrating commands issued by the boot block code for recovering program code in the computer system illustrated in FIG. 1 according to an embodiment of the invention.

FIG. 2 illustrates a block diagram illustrating commands issued by boot block code in the NVRAM 11 for recovering program code in the computer system 2. As briefly described above, the boot block is a hardware protected area in the NVRAM 11 for storing various routines such as the code for starting the computer system 2. As shown in FIG. 2, a boot block 50 is shown as part of the BIOS code in the NVRAM 11. As is understood by those skilled in the art, an NVRAM device for storing BIOS code, such as a flash part, is divided into sectors so that portion so of the device may be updated while others are left alone. In such devices, the boot block is typically the top sector in the flash part and is limited in size so that the remainder of the flash part may be utilized to store BIOS runtime code for supporting the operating system and utilities requirements of a computer system. As a result, the size of the boot block is typically limited to between sixteen and sixty-four kilobytes of "flash" memory.

Turning now to FIG. 2, the NVRAM 11 is shown containing boot block code 50 and runtime BIOS code 51. The boot block code 50, in addition to containing code for starting the computer system 2 (as described above), also contains code for determining the validity of the BIOS code 51 stored in the remainder of the NVRAM 11. After the computer system 2 is powered on, the CPU 4 begins executing the boot block code 50 in the NVRAM 11. If the BIOS code 51 is invalid, the boot block code 50 sets a flag 52 in the image file 29 according to one embodiment of the invention. In an alternative embodiment, the boot block code 50 may set the flag 52 in a memory location in the RAM 8. After the flag is set, the boot block code 50 issues a command to copy the image file 29 to the RAM 8. As defined in this description and the following claims, the flag 52 is a software mark signaling that the BIOS code 51 needs to be updated. For example, the flag 52 may be set if the BIOS code 51 is corrupted or erased. As briefly discussed above, the image file may contain new BIOS code to replace the invalid BIOS code contained in the NVRAM 11. Logical operations carried out by the CPU 4 for recovering invalid BIOS code contained in the NVRAM 11 will be described in greater detail below with respect to FIG. 3.

Figure 3:
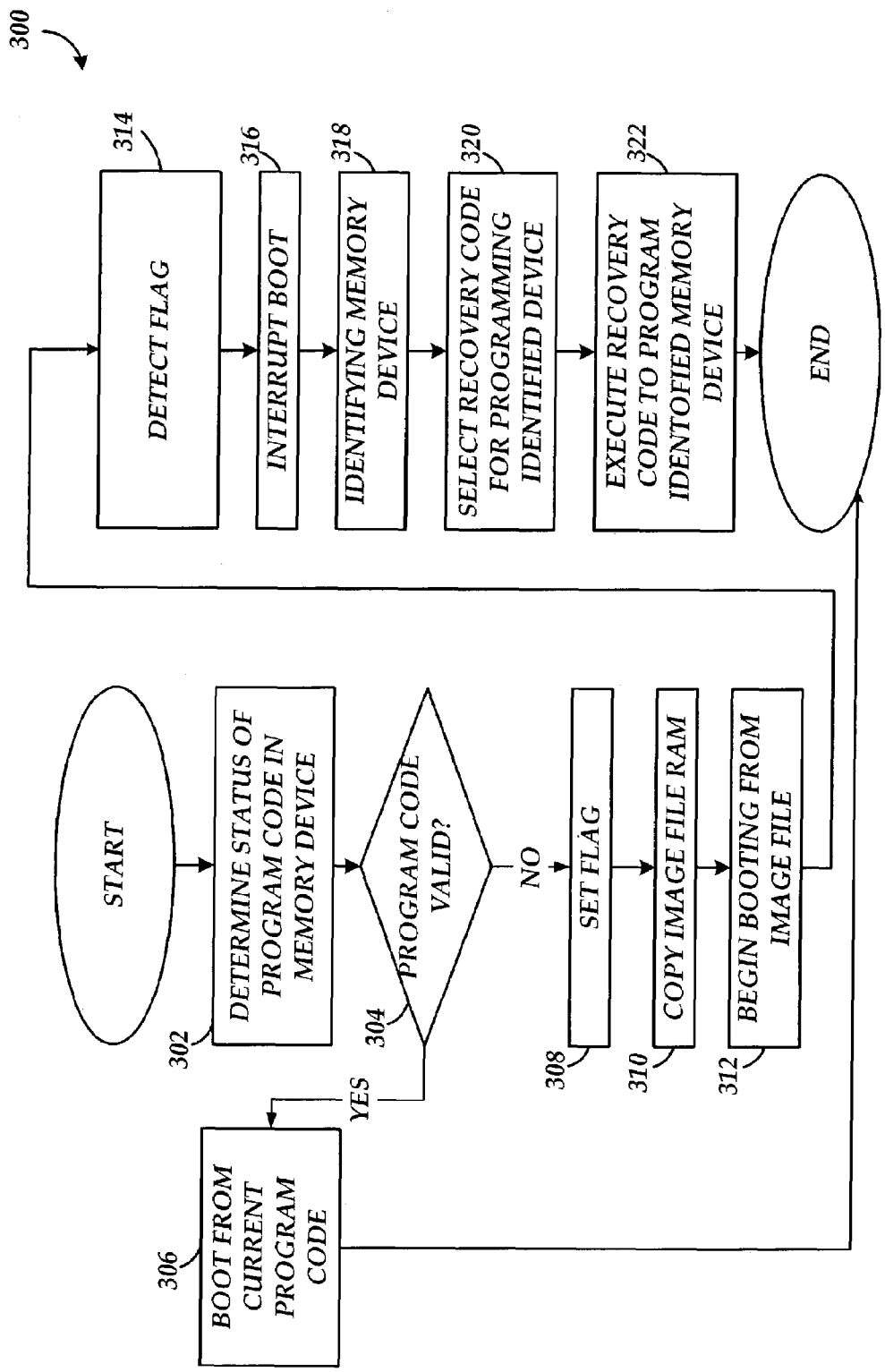
FIG. 3 illustrates logical operations performed in the computer system of FIG. 1 for recovering program code according to an embodiment of the invention.
Figure 4:
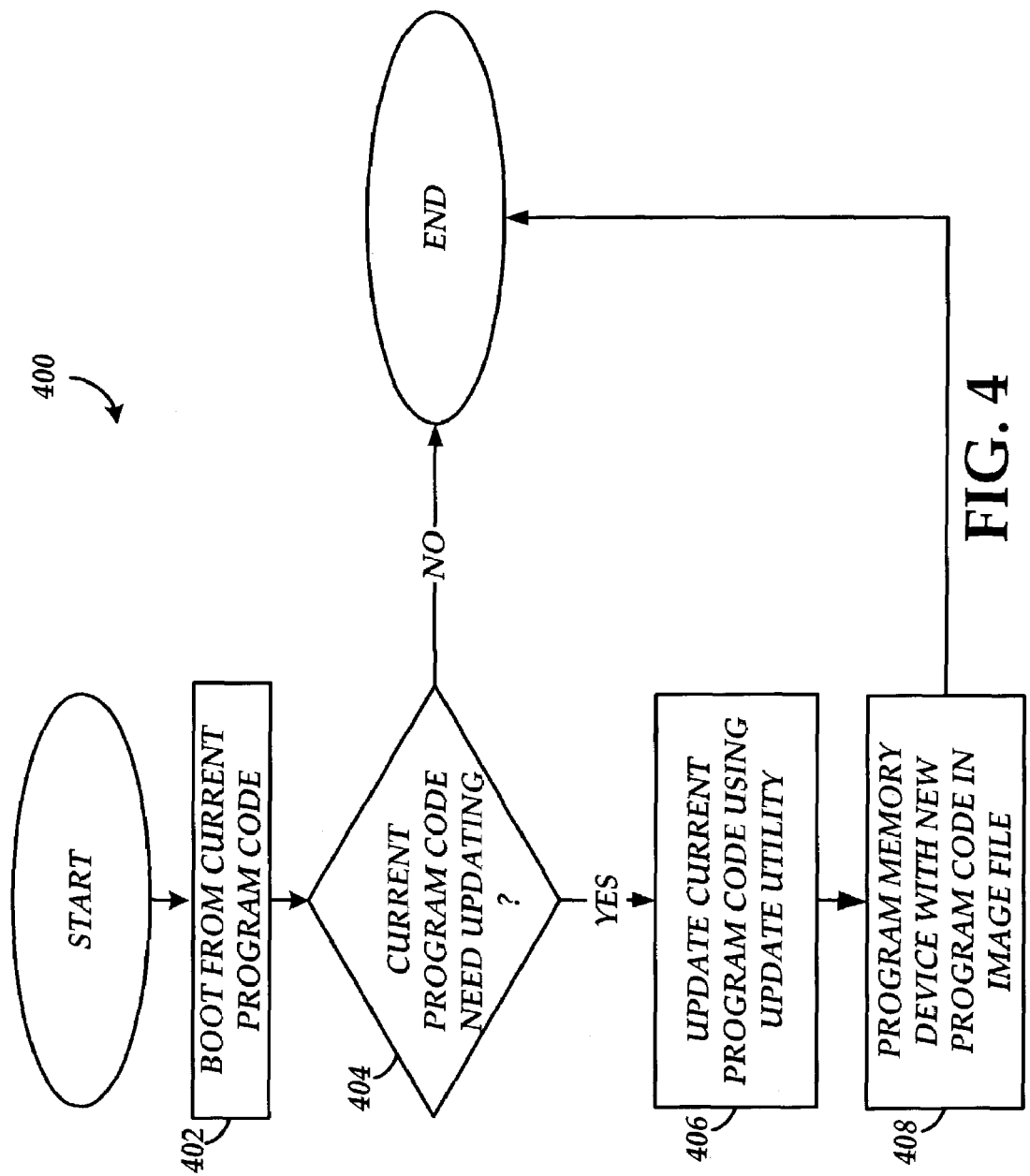
FIG. 4 illustrates logical operations performed in the computer system of FIG. 1 for recovering program code according to an alternative embodiment of the invention.

FIGS. 3-4 show illustrative logical operations performed in the computer system 2 described above in FIGS. 1-2 for recovering program code according to various embodiments of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The logical operations 300 of FIG. 3 begin at operation 302 where the boot block code 50 determines the status of the BIOS code 51 in the NVRAM 11. As described above, the CPU 4 executes the boot block code 50 upon startup of the computer. Once executed, the boot block code 50 performs a variety of tasks including initializing the computer system memory and determining the validity of the BIOS code 51. After determining the status of the BIOS code 51 at operation 302, the logical operations 300 continue to operation 304 where the boot block code 50 determines whether the BIOS code 51 is valid. If the BIOS code 51 is valid, the logical operations 300 continue to operation 306 where the CPU 4 begins booting from the current BIOS code 51 in the NVRAM 11. If the BIOS code 51 is invalid, the logical operations 300 continue to operation 308. It should be understood that the boot block code 50 finds the BIOS code 51 to be invalid if it determines that the BIOS code 51 is corrupted or erased. It should be further understood that the BIOS code 51 may also be found to be invalid as a result of a user-initiated action during the startup of the computer system 2. For example, a user may enter a predefined key combination (e.g., Ctrl+Home) during startup which signals the computer system 2 that the user wishes to update the BIOS code 51 in the NVRAM 11.

At operation 308, the boot block code 50 issues a set flag command to set the flag 52. As briefly described above, the flag 52 is a software mark which indicates that the current BIOS code 51 in the NVRAM 11 needs to be updated. After the flag 52 has been set, the logical operations 300 continue to operation 310 where the boot block code 50 issues a copy command to copy the image file 29 into the RAM 8. The logical operations 300 continue from operation 310 to operation 312 where the CPU 4 begins booting the computer system 2 from code in the image file 29 such as a POST routine. As briefly described above, the POST routine is executed after the computer system is turned on for performing diagnostics and initializing system components in the computer system. Here, the POST routine is executed from the image file 29 during the start of booting the computer system 2.

At operation 314, the code being executed in the image file 29 detects the flag 52 indicating that the BIOS code 51 in the NVRAM 11 needs to be updated, and interrupts the boot of the computer system 2 at operation 316. The CPU 4 then executes the code in the image file 29 from the RAM 8 to identify the NVRAM 11 at operation 318 and to select the appropriate recovery code for programming the NVRAM 11 at operation 320. The logical operations 300 then continue to operation 322 where the CPU 4 executes the selected recovery code to program the NVRAM 11 with the recovery program code contained in the image file 29.

As will be understood by those skilled in the art, NVRAM or flash memory devices may be programmed by first erasing the blocks of memory containing the current BIOS code and then re-programming the bytes in each block of memory until the entire BIOS code has been updated. It should be understood that the recovery program code contained in the image file 29 may be a valid copy of the invalid BIOS code 51 or an updated version of the BIOS code 51. Thus, the logical operations 300 described above may be utilized to replace a current version of BIOS code or update BIOS code to a new version. It should be further understood that in one embodiment the POST routine may initialize computer system components, such as a video display device connected to the input/output controller 22, prior to detecting the flag 52 indicating an update of the BIOS code 51. In this manner, status messages may be presented to a user on the video display device in the computer system 2 during the BIOS code update.

It will be appreciated by those skilled in the art that the code for programming memory devices or flash parts is removed from the boot block. Embodiments of the present invention use existing BIOS code in a computer system to program the flash parts. If will be further appreciated that the execution of the code in the image file 29 from RAM enables the support of a larger number of memory devices or flash parts by the BIOS in the computer system 2 than was previously afforded in the boot block which has a fixed memory size. Moreover, the image file enables BIOS programmers to add support for new memory devices as they are developed without reprogramming or updating existing boot block code.

FIG. 4 shows illustrative logical operations performed in the computer system 2 described above in FIGS. 1-2 for recovering program code according to an alternative embodiment of the invention. The logical operations 400 of FIG. 4 begin at operation 402 where the current BIOS code 51 in the NVRAM 11 is executed and performs a complete boot of the computer system 2 including loading the operating system 16. At operation 404 a determination is made as to whether the BIOS code 51 needs to be updated. This determination may be made by a user of the computer system 2. For example, a user intending to update the BIOS code may let the computer system 2 boot with the current version of the BIOS code prior to updating with the new BIOS code.

If it is determined that the current BIOS code 51 needs to be updated, the logical operations 400 then continue at operation 406 where the user executes the update utility 30 to updates the BIOS code 51 with the recovery program code in the image file 29. Finally, the update utility then programs the NVRAM 11 with the recovery program code in the image file 29 at operation 408.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method of recovering program code in a computer system comprising:
    determining that current program code stored in a memory device in the computer system is invalid;
    setting a flag in an image file in a storage device separate from the memory device and a main memory in the computer system, the flag indicating that the current program code is invalid;
    executing copy code stored in the memory device to copy the image file from the storage device to the main memory in the computer system, the image file comprising recovery program code for the memory device;
    initiating a boot of the computer system from the image file in the main memory;
    detecting whether the flag is set in response to initiating the boot of the computer system from the image file in the main memory;
    interrupting the boot of the computer system upon detecting that the flag is set to update the current program code; and
    updating the current program code in the memory device with the recovery program code.

2. The method of claim 1, further comprising displaying a plurality of status messages on a video display device in the computer system while updating the current program code in the memory device with the recovery program code.

3. The method of claim 1, wherein updating the current program code in the memory device with the recovery program code comprises:
    identifying the memory device in response to initiating the boot of the computer system from the image file in the main memory;
    selecting recovery code in the image file for programming the identified memory device in response to initiating the boot of the computer system from the image file in the main memory; and
    executing the selected recovery code to program the identified memory device with the recovery program code.

4. The method of claim 3, wherein programming the identified memory device with the recovery program code comprises:
    erasing the current program code in the memory device; and
    programming the memory device with the recovery program code.

5. The method of claim 1, wherein determining that the current program code stored in a memory device in the computer system is invalid comprises determining that the current program code is corrupted.

6. The method of claim 1, wherein determining that the current program code stored in a memory device in the computer system is invalid comprises determining that a user initiated request to update the current program code has been made.

7. The method of claim 1, wherein the recovery program code is a valid copy of the current program code.

8. The method of claim 1, wherein the recovery program code is an updated version of the current program code.

9. The method of claim 1, wherein the current program code comprises a BIOS for the computer system.

10. The method of claim 1, wherein the main memory is a random access memory (RAM) in the computer system.

11. A computer storage medium having computer-executable instructions for performing the method of claim 1.

12. A computer system for recovering program code stored in a memory device, comprising:
   a first memory device comprising current program code for initializing the computer system;
   a second memory device for storing an image file comprising recovery code and recovery program code for the first memory device; and
   a processor, functionally coupled to the first and second memory devices, the processor being responsive to computer-executable instructions contained in the first memory device and operative to:
      determine whether the current program code stored in the first memory device in the computer system is valid;
      set a flag in the image file in a storage device in the computer system separate from the first memory device and the second memory device, the flag indicating that the current program code is invalid;
      if it is determined that the current program code is invalid, copy the image file from the storage device in the computer system to the second memory device;
      initiate a boot of the computer system from the image file in the second memory device;
      detect whether the flag is set in response to initiating the boot of the computer system from the image file in the second memory device;
      interrupt the boot of the computer system upon detecting that the flag is set to update the current program code;
      from the second memory device, execute the recovery code contained in the image file to update the current program code in the first memory device with the recovery program code; and
      if it is determined that the current program is valid, initiate a boot of the computer system from the current program code.

13. The computer system of claim 12, further comprising a video display device for displaying a plurality of status messages while the current program code in the first memory device is being updated with the recovery program code.

14. The computer system of claim 12, wherein the processor, in executing the recovery code contained in the image file to update the current program code in the first memory device with the recovery program code, is operative to program the first memory device with the recovery program code.

15. The computer system of claim 14, wherein the processor, prior to programming the first memory device with the recovery program code, is operative to erase the current program code in the first memory device.

16. The computer system of claim 12, wherein the processor, in determining whether the current program code stored in the first memory device is valid, is operative to determine whether the current program code is corrupted.

17. The computer system of claim 12, wherein determining whether the current program code stored in a memory device in the computer system is valid comprises determining whether a user initiated request to update the current program code has been made.

18. The computer system of claim 12, wherein the recovery program code is a valid copy of the current program code.

19. The computer system of claim 12, wherein the recovery program code is an updated version of the current program code.

20. The computer system of claim 12, wherein the current program code comprises a BIOS for the computer system.

21. The computer system of claim 12, wherein the first memory device is a random access memory (RAM) device.

* * * * *